United States Patent [19]

Youmans et al.

[11] Patent Number: 4,657,468

[45] Date of Patent: Apr. 14, 1987

[54] VEHICLE TOWING APPARATUS

[76] Inventors: Gordon D. Youmans; Audrey L. Youmans, both of 17375 Hawthorne Ave., Anderson, Calif. 96007

[21] Appl. No.: 802,090

[22] Filed: Nov. 27, 1985

Related U.S. Application Data

[63] Continuation of Ser. No. 372,702, Apr. 28, 1982, abandoned.

[51] Int. Cl.⁴ ............................................. B60P 3/12
[52] U.S. Cl. ................................. 414/563; 280/402; 294/67.3; 294/904
[58] Field of Search ............... 414/563, 460, 607, 630, 414/785; 280/402; 294/67.1, 67.3, 81.21, 81.5, 904; 293/12, 103, 117, 118, 119

[56] References Cited

U.S. PATENT DOCUMENTS

| | | | |
|---|---|---|---|
| 1,754,104 | 4/1930 | Hoffman | 293/119 |
| 3,154,205 | 10/1964 | Gillem | 414/563 |
| 3,182,829 | 5/1965 | Wagner | 294/82 AH X |
| 3,272,287 | 9/1966 | Easton | 414/785 X |
| 3,434,607 | 3/1969 | Nelson | 414/563 |
| 3,490,627 | 1/1970 | Goldston | 414/563 |
| 3,690,482 | 9/1972 | Gaumont | 414/563 |
| 3,897,879 | 8/1975 | Bubik | 414/563 |
| 3,924,763 | 12/1975 | Pigeon | 414/563 |
| 4,266,904 | 5/1981 | Fadness | 414/460 |

Primary Examiner—Robert J. Spar
Assistant Examiner—Stuart J. Millman

[57] ABSTRACT

Vehicle towing apparatus is disclosed which is capable of being mounted on a pickup truck or van without losing the use of any substantial part of the truck or van body.

12 Claims, 12 Drawing Figures

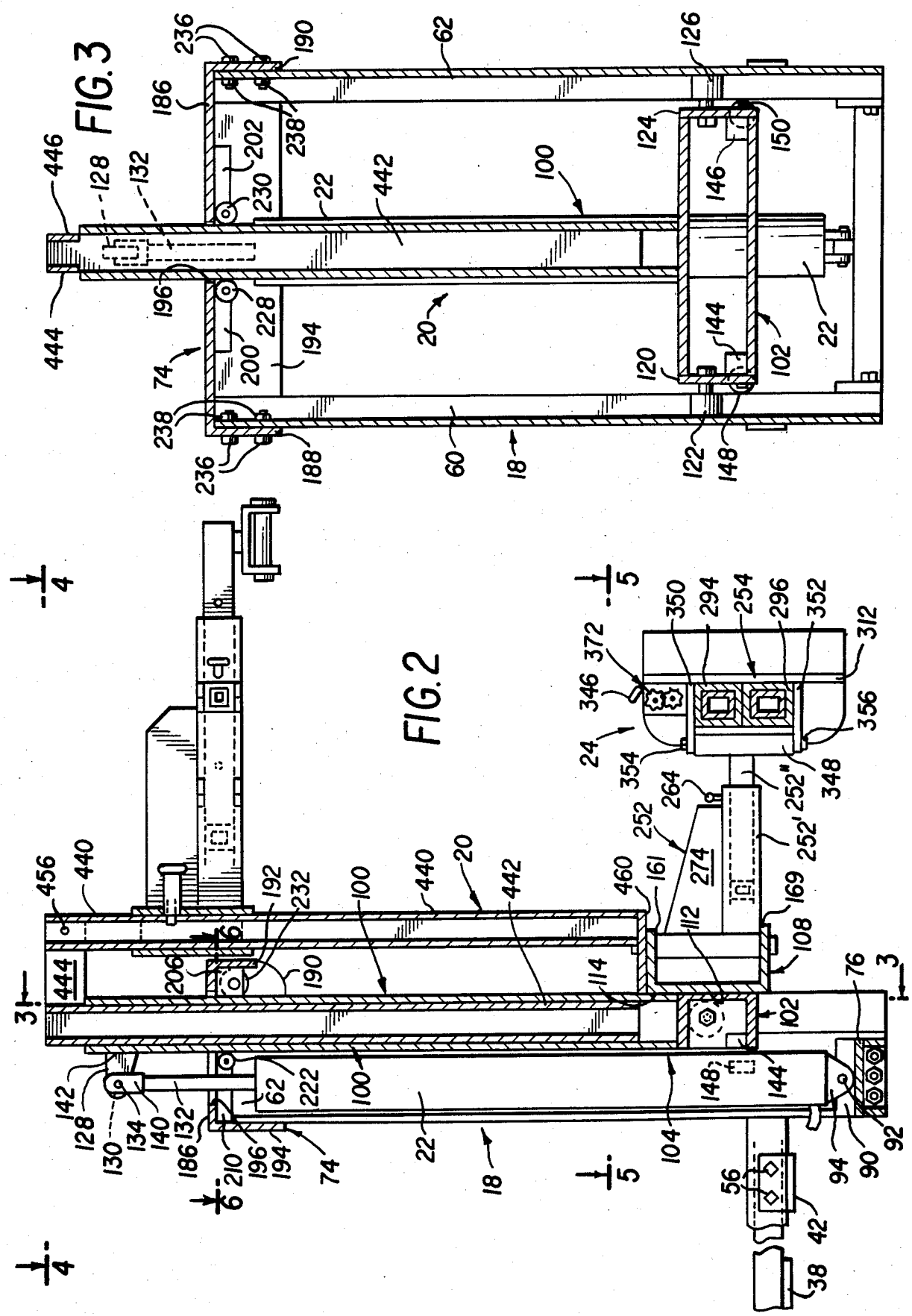

VEHICLE TOWING APPARATUS

This is a continuation of co-pending application Ser. No. 372,702 filed on 4/28/82 now abandoned.

BACKGROUND OF THE INVENTION

1. Field of the Invention

Our invention relates to vehicle towing apparatus, and more particularly to vehicle towing apparatus of the kind which can be retrofitted to standard pickup trucks and the like.

2. Description of the Prior Art

The term "prior art" as used herein or in any statement made by or on behalf of applicants means only that any document or thing referred to as prior art bears, directly or inferentially, a date which is earlier than the effective filing date hereof.

Vehicle towing apparatus for retrofitting to standard pickup trucks and the like is known in the prior art. For example, such vehicle towing apparatus is shown and described in U.S. Pat. No. 3,154,205, issued to Luke D. Gillem on Oct. 27, 1964; and in U.S. Pat. No. 3,779,407, issued to Luke B. Gillem on Dec. 18, 1973.

Such prior art towing apparata, however, are very heavy and of unitary construction, because of which characteristics they are expensive to ship to the purchaser and difficult to fit to a towing vehicle, requiring the services of a lift truck. Further, these prior art vehicle towing apparata are characterized by a relatively great distance between the towing vehicle and the vehicle being towed, which results in poor and even sometimes dangerous handling characteristics for the towing vehicle. Additionally, attempts to negotiate tight corners while towing with these prior art towing apparata have resulted in contact between the outer edges of the towed and towing vehicles, resulting in damage to one or both of them.

It is believed that the following documents contain information which is or might be considered to be material to the examination of this patent application: U.S. Pat. No. 3,897,879; U.S. Pat. No. 3,924,763.

No representation or admission is made that any of the above-cited documents is part of the prior art, or that a search has been made, or that no more pertinent information exists.

SUMMARY OF THE INVENTION

Accordingly, it is an object of our invention to provide vehicle towing apparata which are much lighter than the vehicle towing apparata of the prior art, for the same vehicle towing capacity.

Another object of our invention is to provide vehicle towing apparata which are subdivided into a small plurality of subassemblies, each of which is compact and relatively cheap to ship to the purchaser, and all of which can be operatively joined together, and to the towing vehicle, by simple bolted connections.

Yet another object of our invention is to provide such vehicle towing apparata in which each of such subassemblies is light enough in weight to be installed on the towing vehicle by hand, and without the aid of a lift truck or the like.

A further object of our invention is to provide vehicle towing apparata in which the bumper assembly which contacts the towed vehicle can be suitably adjusted in width by means of a single telescoping arm and locking pin adjustment.

Another object of our invention is to provide vehicle towing apparatus which are characterized by ease of folding of the apparatus into its storage position closely adjacent the rear end of the towing vehicle.

Another object of our invention is to provide vehicle towing apparatus in which the distance between the towing and towed vehicles can be reduced to a minimum for each type of vehicle being towed.

Another object of our invention is to provide vehicle towing apparata which do not have to be bolted to the frame of the towing vehicle, but rather can be bolted to the bed plate of the towed vehicle body.

Another object of our invention is to provide vehicle towing apparata in which the amount of space within the vehicle body occupied by the towing apparatus is reduced to a minimum.

Another object of our invention is to provide vehicle towing apparata including towed vehicle front wheel receiving cradles, which cradles are readily fitted to the front wheels of vehicles to be towed.

Another object of our invention is to provide vehicle towing apparata including wheel cradle suspending means which are mounted on the bumper assembly carriages thereof, and do not require separate power operating means.

Another object of our invention is to provide vehicle towing apparata the bumper assembly carriages of which are substantially free from jamming in their masts.

Other objects of our invention will in part be obvious and will in part appear hereinafter.

Our invention, accordingly, comprises the apparatus embodying features of construction, combinations of elements, and arrangements of parts, all as exemplified in the following disclosure, and the scope of our invention will be indicated in the appended claims.

In accordance with a principal feature of our invention vehicle towing apparata are provided in which the bumper assembly carriages are generally of inverted-T configuration, and are slidably joined to their associated masts at three, rather than four, locations.

In accordance with another principal feature of our invention vehicle towing apparata are provided in which the bumper assemblies comprise two elongatable supporting arms and one elongatable bumper pad carrying arm.

In accordance with another principal feature of our invention such support arms are mounted upon the portion of the apparatus fixed to the towing vehicle by means of two separate but closely adjacent pivots.

In accordance with another principal feature of our invention vehicle towing means are provided which include rigid wheel cradle means comprising two wheel receiving means mounted on opposite ends of a rigid staff or beam, at least one of said wheel receiving means being pivotable about one end of said staff or beam, and selectively lockable in a predetermined position with respect to said staff or beam.

In accordance with another principal feature of our invention vehicle towing means are provided which comprise wheel cradle suspending means which are affixed to the bumper assembly carriage means for motion therewith, and which can be folded into close proximity to the rear of the towing vehicle and also lowered from their operative positions on their associated bumper assembly carriages.

For a fuller understanding of the nature and objects of our invention, reference should be had to the following detailed description, taken in connection with the accompanying drawings.

BRIEF DESCRIPTION OF THE DRAWINGS

FIG. 2 is a partial sectional view of the towing apparatus of FIG. 1, taken along line 2—2;

FIG. 3 is a partial sectional view of the towing apparatus of FIG. 2, taken along line 3—3;

DESCRIPTION OF THE PREFERRED EMBODIMENT

Figure 1:
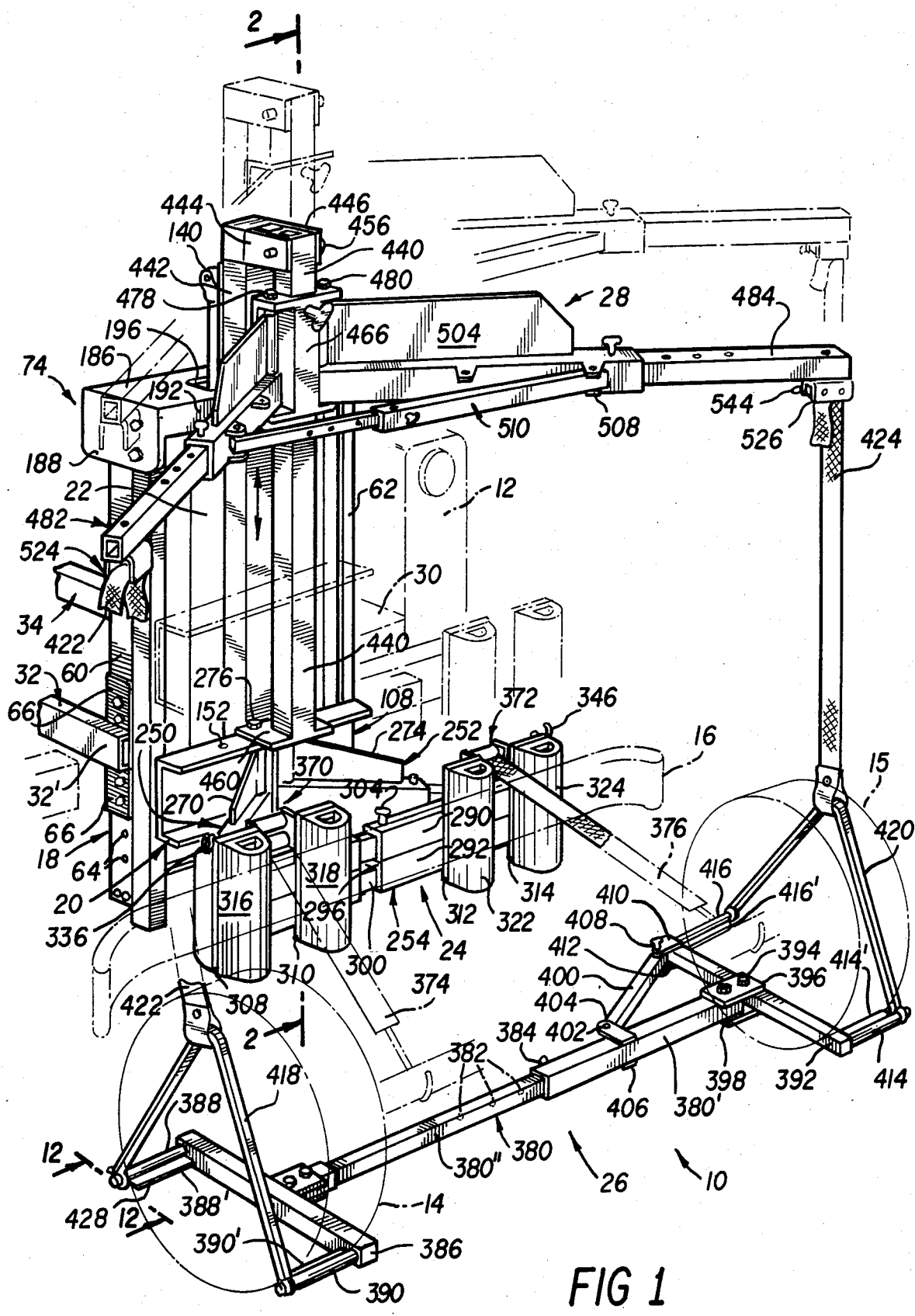
FIG. 1 is a perspective view of the vehicle towing apparatus of the preferred embodiment of our invention, mounted on a towing vehicle.

Referring now to FIG. 1, there is shown a vehicle towing apparatus 10 of our invention, affixed to a pickup truck 12.

Also shown in FIG. 1 in phantom are the front wheels 14, 15 and front bumper 16 of a passenger vehicle which is being towed by pickup truck 12 by means of the towing apparatus 10 of our invention.

As seen in FIG. 1, towing apparatus 10 comprises the following principal assemblies: a mast assembly or mast 18; a carriage assembly or carriage 20, which is mounted upon mast 18 for vertical sliding thereupon; a hydraulic cylinder 22, which is interposed between mast 18 and carriage 20, and serves to drive carriage 20 into selected vertical positions on mast 18 (the pressure source and controls for the working fluid in cylinder 22 are of well-known type and thus are not shown or described herein, for a description of such well-known arrangements reference should be had to U.S. Pat. No. 3,154,205).

As also seen in FIG. 1, towing apparatus 10 further comprises an adjustable bumper assembly or bumper 24; a cradle 26, for supporting the front wheels 14, 15 of the vehicle being towed; and a cradle suspender assembly or cradle suspender 28.

For further details of mast 18 and carriage 20 particular reference should be had to FIGS. 2, 3, 5, 6, and 7.

Figure 5:
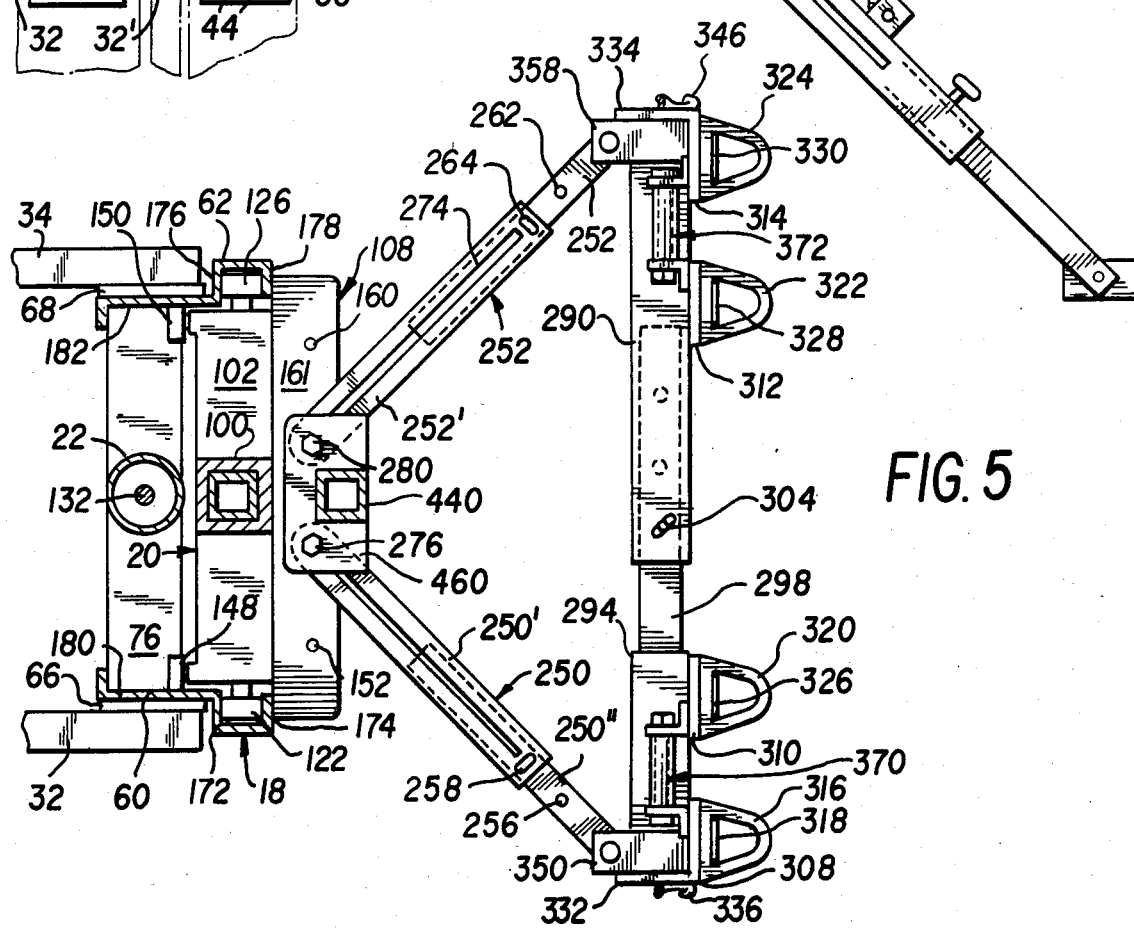
FIG. 5 is a partial sectional view of the vehicle towing apparatus of FIG. 2, taken along line 5—5.
Figure 7:
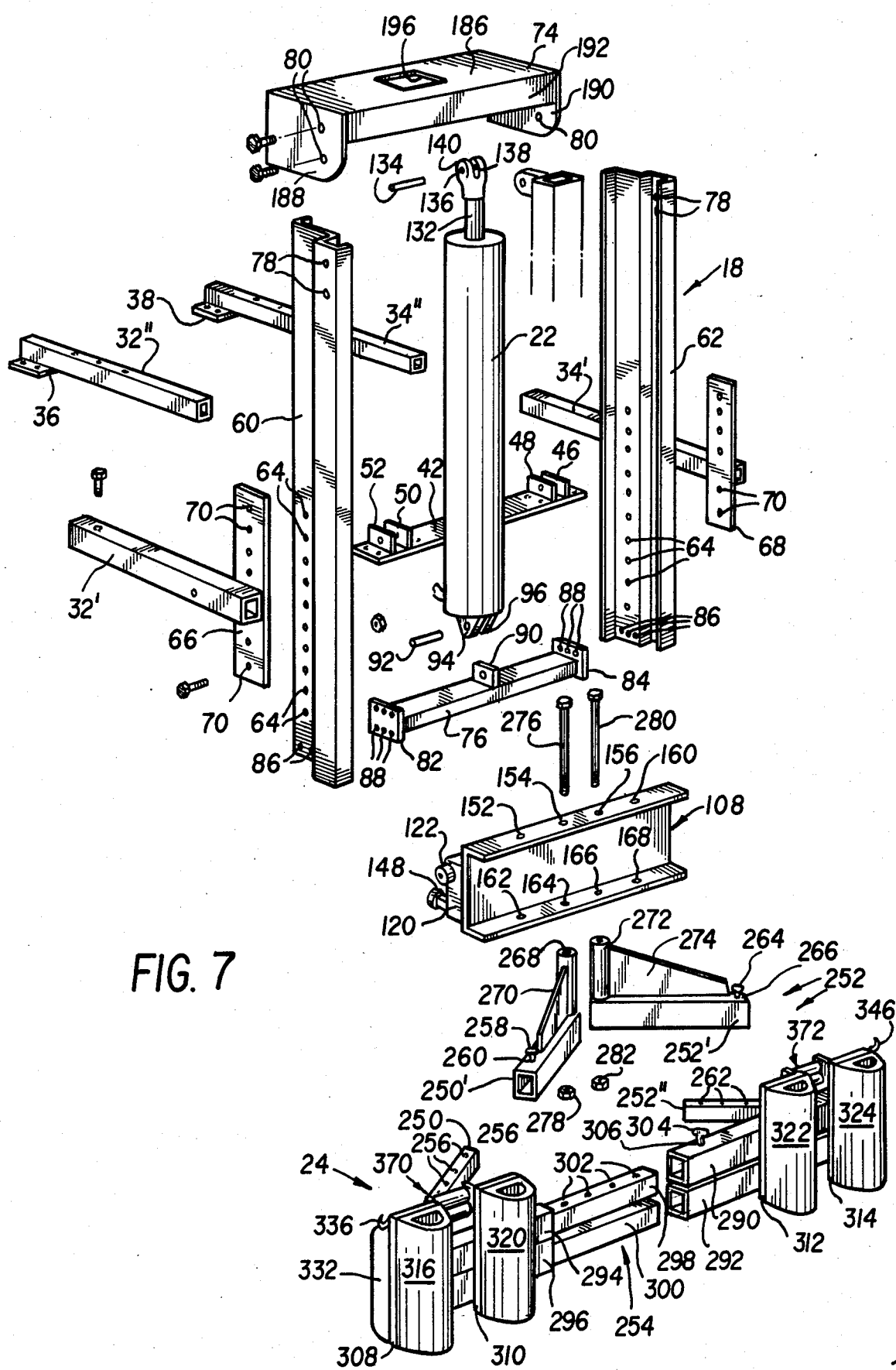
FIG. 7 is an exploded view of the mast, the carriage, and the bumper assembly of the device of the preferred embodiment.

For further details of bumper 24 particular reference should be had to FIGS. 2, 5, and 7.

Figure 4:
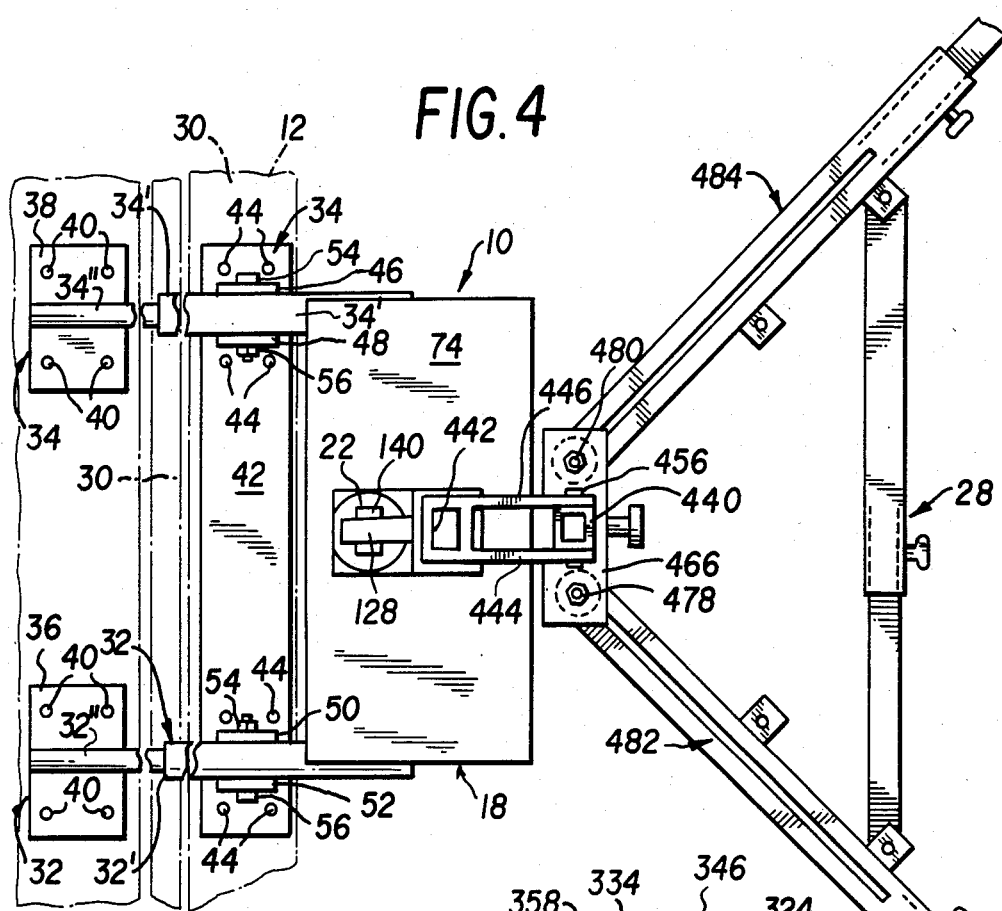
FIG. 4 is a plan view of the vehicle towing apparatus of FIG. 1, taken along line 4—4 of FIG. 2.
Figure 8:
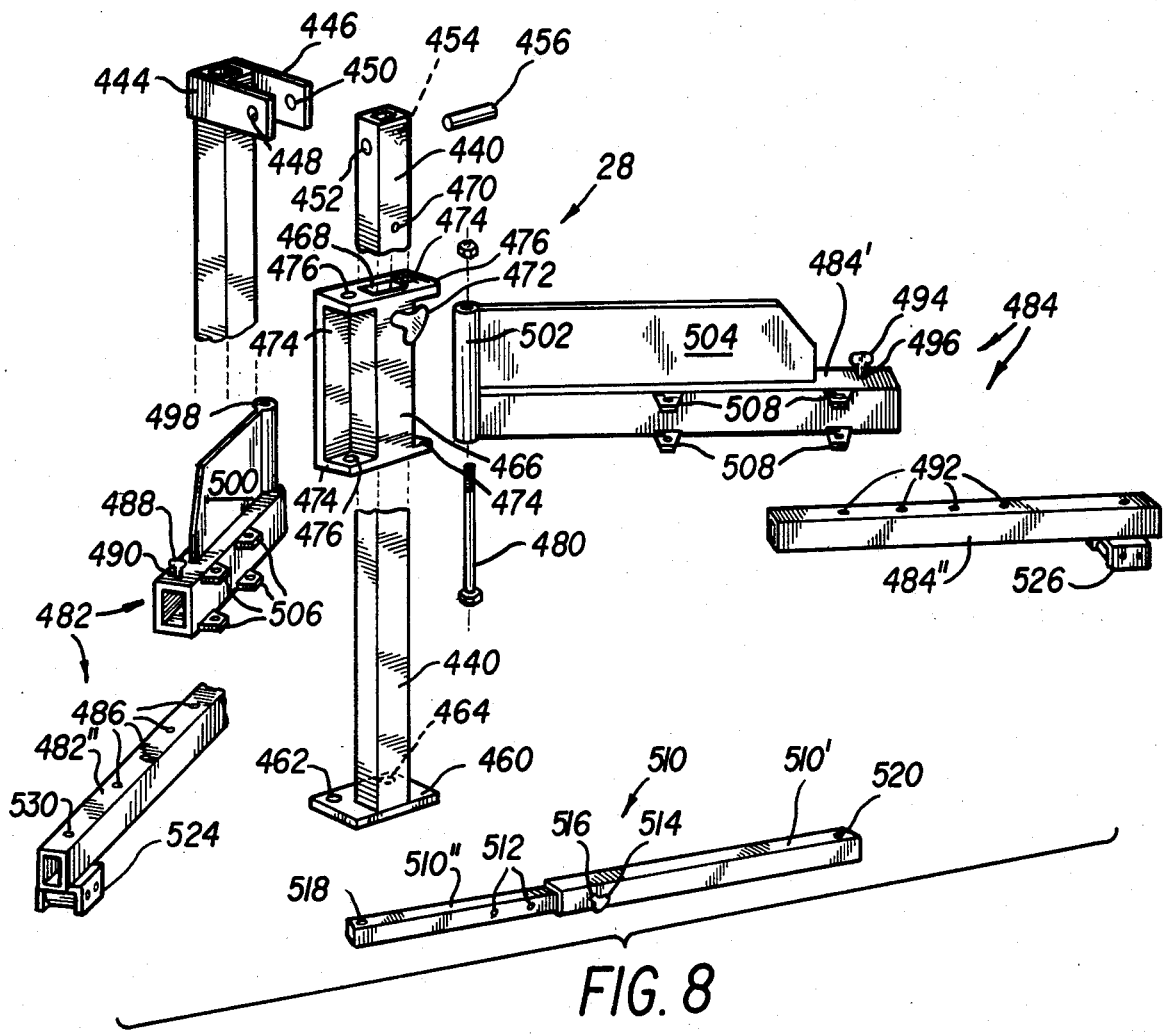
FIG. 8 is an exploded view of the wheel cradle suspender assembly of the device of the preferred embodiment.

For further details of cradle suspender 28 particular reference should be had to FIGS. 4 and 8.

As best seen in FIG. 4, mast 18 of towing apparatus 10 is affixed to the bed 30 of pickup truck 12 by means of two mounting arms 32, 34. Each mounting arm is comprised of a first box tube member within which is telescoped a second box tube member of smaller cross-section. Thus, for example, mounting arm 32 is comprised of a first box tube member 32' within which is telescoped a second box tube member 32".

A bed plate 36 is attached to the outer end of member 32", as by arc welding, and a similar bed plate 38 is similarly attached to the outer end of member 34". Bed plates 36 and 38 are attached to bed 30 by means of suitable bolts and cooperating nuts 40. Mounting arms 32 and 34 and bed plates 36 and 38 are fabricated from generally available preformed steel tubes and steel plates in manners well-known to those having ordinary skill in the art.

As also seen in FIG. 4, a large bed plate 42 is attached to truck bed 30 by means of suitable bolts 44 and associated nuts. Bed plate 42 is provided with upstanding connecting plates 46, 48, 50, 52, as by arc welding. Connecting plates 46, 48, 50, 52 are suitably spaced and located to receive mounting arm members 32' and 34', and mounting arm members 32' and 34' are secured thereto by means of suitable bolts 54 and nuts 56.

Thus, comparing FIGS. 1 and 4, it will be seen that the mounting arms supporting mast 18 are securely affixed to the bed 30 of pickup truck 12.

It is to be particularly noted that because of the highly superior lightweight design of towing apparatus 10, made possible by the application of the principles of our invention, towing apparatus 10 may for many applications be mounted on its associated truck only by bolting the bed plates to the bed of the truck, and without clamps engaging the frame of the truck. In some applications of our invention, however, and for mounting on some trucks, it may be necessary to clamp the lower ends of certain bed plate bolts to the frame of the equipped truck. It is to be understood that such installations, involving the clamping or otherwise securing of the mounting arms to the truck frame, fall within the scope of our invention.

Referring now to FIG. 7, it will be seen that there is shown an exploded view of mast 18. As seen in FIG. 7, mast 18 comprises two side rails 60, 62, each of which is cut from a suitable steel fabrication of the same type. Each side rail is provided with suitable holes 64 adapted to receive mounting bolts for mounting it on its associated mounting arm 32, 34. As also seen in FIG. 7, a pair of mounting plates 66, 68 are affixed to the respective ends of mounting arms 32, 34, as by arc welding. Each mounting plate 66, 68 is provided with holes 70 so mutually located as to register with respective corresponding holes 64 in associated side rails 60, 62 to receive bolts for affixing these mounting plates to their corresponding side rails 60, 62. In accordance with our invention, the respective sets of holes 64, 70 will be uniformly spaced, and additional holes will be provided along the rear webs of side rails 60, 62, whereby mast 18 may be mounted at differing desired heights above the ground on which vehicle 12 stands.

As may also be seen from FIG. 7, the upper ends of side rails 60, 62 are joined by means of a head 74, and the lower ends of side rails 60, 62 are joined by means of a lower cross member 76. Suitable registering holes 78, 80 are provided in side rails 60, 62 and head 74, respectively, for receiving bolts by which head 74 is securely bolted to the upper ends of both side rails 60, 62. Suitable securing plates 82, 84 are affixed to the opposite ends of cross member 76, as by arc welding. Suitable registering holes 86, 88 are provided in side rails 60, 62 and securing plates 82, 84, respectively, for receiving bolts by which cross member 76 is securely bolted to the lower ends of both side rails 60, 62.

Thus, it will be seen that mast 18 takes the form of a rigid steel frame principally comprising side rails 60, 62, head 74, and lower cross member 76, which are united into a single assembly by means of suitable bolts passing through suitable holes, and associated nuts.

As also seen in FIG. 7, a lug 90 is affixed to the center of the upper surface of cross member 76, and the lower end of hydraulic cylinder 22 is pivotably affixed to lug 90 by means of a pin or the like which passes through registering holes in lug 90 and the lugs 94 and 96 which are affixed to cylinder 22 in the well-known manner. Pin 92 is retained in these registering holes in the well-known manner.

Referring now to FIGS. 2 and 3, it will be seen that carriage 20 has a generally T-shaped configuration, and comprises vertical member 100 and horizontal member 102.

As may be seen by comparison of FIGS. 2 and 3, vertical member 100 is a hollow box tube, preferably cut from a suitable steel fabrication, and horizontal member 102 is a C-shaped steel beam having an open face 104. The lower end of vertical member 100 is secured to the top face of horizontal member 102 by suitable weldments 106, 107.

Carriage 20 further comprises a mounting beam 108, provided for the purpose of mounting bumper assembly 24 on carriage 20. Mounting beam 108 is affixed to the outer faces of members 100 and 102 by suitable weldments, 112, 114, etc.

As seen in FIG. 3, an end plate 120 is affixed to one end of horizontal member 102, as by arc welding. A suitable roller 122 is rotatably mounted on end plate 120. A second end plate 124 is affixed to the other end of horizontal member 102 in the same manner, and a suitable roller 126 is rotatably mounted thereon. Rollers 122 and 126 will preferably be ball or roller bearing rollers mounted on their corresponding end plates by well-known commercially available bearing means.

As seen in FIG. 2, vertical member 100 is provided at its upper end with a lug 128 through which passes a hole 130. As explained hereinafter, lug 128 is pivotably affixed to the outer end of piston rod 132 of cylinder 22, (FIG. 7) by means of a pin 134 which passes through hole 130 and through corresponding holes 136 and 138 in clevis 140 attached to the outer end of piston rod 132. Pin 134 is fixed in holes 130, 136, and 138 in the well-known manner. Lug 128 is permanently affixed to vertical member 100 by a weldment 142 and a second, opposite weldment which is not shown.

Comparing FIGS. 2 and 3, it may be seen that a pair of ears 144, 146 are affixed to cross member 102 at its opposite extremities, as by arc welding.

A roller 148 is rotatably affixed to the outer face of ear 144, and a corresponding roller 150 is rotatably affixed to the outer face of ear 146, as by suitable stub shafts passing through holes in ears 144 and 146 and affixed therein, and having suitable ball or roller bearings mounted upon said stub shafts and rollers 148 and 150 mounted on said bearings.

As seen in FIGS. 5 and 7, four holes 152, 154, 156, 160 are provided through the upper horizontal flange 161 of mounting beam 108, and a corresponding set of four aligned holes 162, 164, 166, 168 are provided through the lower horizontal flange 169 of mounting beam 108. The function of these holes will be explained hereinafter.

Referring now to FIG. 5, it will be seen that roller 122 is movably confined between wall portions 172 and 174 of mast side rail 60; and that roller 126 is movably confined between wall portions 176 and 178 of mast side rail 62. It will further there be seen that roller 148 bears against the inner face of web portion 180 of mast side rail 60, and that roller 150 bears against the inner face of web portion 182 of mast side rail 62.

As best seen in FIG. 7, mast head 74 comprises a main, flat steel plate 186, two end plates 188, 190, and a rear plate 192. As seen in FIG. 2, mast head 74 also comprises a front plate 194. An opening 196 is provided in main plate 186. The several plates 186, 188, 190, 192, 194 of head 74 are permanently joined, as by arc welding, into a rigid unitary structural member.

Figure 6:
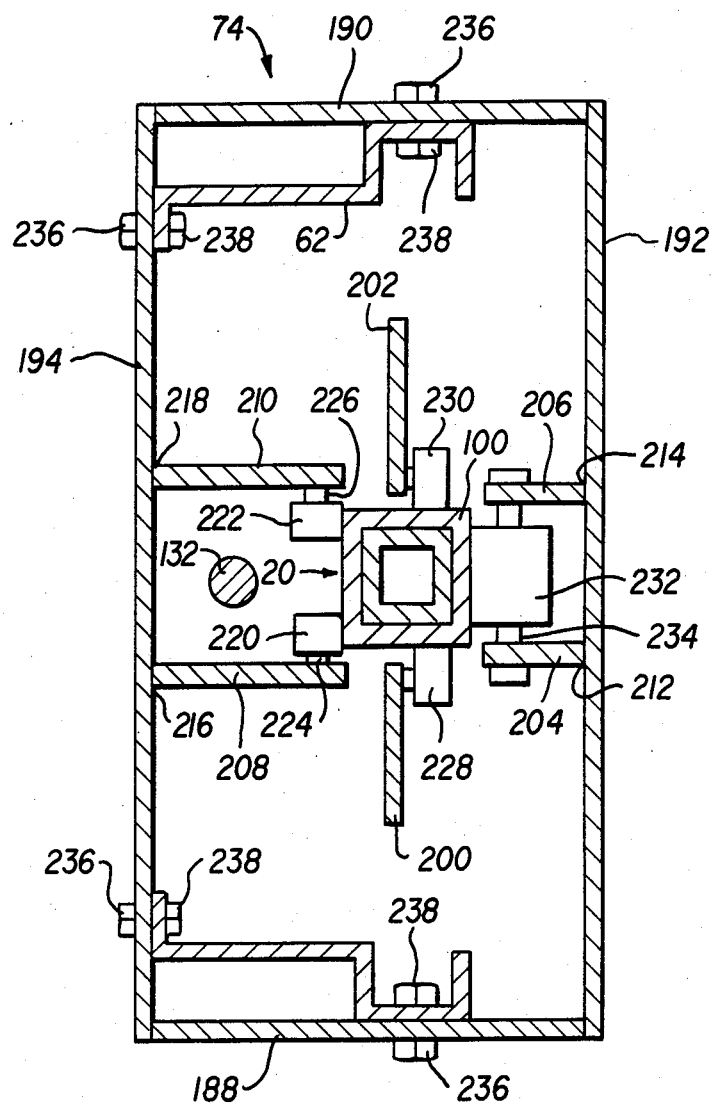
FIG. 6 is a partial sectional view of the vehicle towing apparatus of FIG. 2, taken along line 6—6.

As best seen in FIG. 6, a plurality of mounting members 200, 202, 204, 206, 208, 210 are disposed within head 74. Each of these mounting members is affixed to main plate 186, as by arc welding, and, in addition, mounting members 204 and 206 are affixed to rear plate 192 by suitable weldments 212, 214, and mounting plates 208, 210 are affixed to front plate 194 by suitable weldments 216, 218.

As also seen in FIG. 6, a pair of rollers 220, 222 are journaled on stub shafts 224, 226, which themselves are suitably affixed, respectively, to mounting members 208, 210. Similarly, a pair of rollers 228, 230 are journaled upon stub shafts which are themselves affixed, respectively, to mounting members 200 and 202; and a single roller 232 is journaled on a shaft 234, the ends of which are respectively mounted in suitable openings in mounting members 204 and 206.

As also seen in FIG. 6, head 74 is fixedly mounted on the tops of side rails 60 and 62 by means of suitable bolts 236, nuts 238, etc. It is to be particularly noted that in accordance with the principles of our invention towing apparatus 10 is divided into a plurality of subassemblies which are joined by nuts and bolts, in such manner that towing apparatus 10 can be erected by hand on the bed 30 of truck 12 without the need for a crane, lift truck, or the like. In addition, these subassemblies are so constructed and arranged as to be separately packed and shipped to the purchaser at minimum shipping cost.

Referring again to FIG. 6, it will be seen that vertical member 100 is captive between rollers 220, 222, 228, 230, and 232. Thus, the upper end of carriage 20 is slidable within head 74, but at the same time is not permitted to move horizontally with respect to head 74.

Comparing FIGS. 5 and 6, then, it will be seen that carriage 20 is vertically slidably mounted on mast 18. As best seen in FIG. 2, the position of carriage 20 on mast 18 is determined by hydraulic cylinder 22.

Before leaving the description of mast 18 and carriage 20, it is to be particularly noted that while towing apparatus 10 of our invention is shown and described herein as being mounted on a pickup truck 12, it is a particular feature of our invention that towing apparatus 10 need not be mounted on an open body truck, such as a pickup truck or the like, but rather may be mounted on a closed van, through the rear wall or doors of which are cut two openings, each sufficiently large to accommodate one of the mounting arms 32, 34. We do not believe that any previously known towing apparatus is thus adaptable to mounting on a van or similar closed-body truck. Thus, our invention makes it possible to convert a van or the like into a tow truck which at the same time substantially completely retains the advantages of a closed-body truck, except for the use of rear doors.

Referring again to FIG. 7, and comparing the same with FIG. 5, there is shown in detail the parts of bumper assembly or bumper 24 and their interaction.

In accordance with a particular feature of our invention, bumper assembly 24 comprises two telescopingly adjustable support arms 250, 252 and a telescopingly adjustable bumper arm 254. Support arm 250 comprises an inner arm 250' in which is telescopingly received an outer arm 250". Both of the arms 250', 250" are prefabricated hollow steel box beams of generally rectangular cross-section. Support arm 252 comprises an inner arm 252' in which is telescopingly received an outer arm 252". Both of the arms 252', 252" are prefabricated hollow steel box beams of generally rectangular cross-section.

A plurality of spaced holes 256 in the top of outer arm 250", and a T-headed pin 258 which interfits with a hole 260 in the top of inner arm 250', are provided for locking inner 250' and outer arm 250" together in different selected degrees of mutual engagement, and thus locking arm 250 in different, selected degrees of extension.

Similarly, a plurality of spaced holes 262 in the top of outer arm 252", and a T-headed pin 264 which interfits with a hole 266 in the top of inner arm 252', are provided for locking inner arm 252' and outer arm 252" in different, selected degrees of mutual engagement, and thus locking arm 252 in different, selected degrees of extension.

As further seen in FIG. 7, a steel tube 268 is integrated with the inner end of inner arm 250', as by arc welding, and a steel web plate 270 is permanently affixed to inner arm 250' and steel tube 268, as by arc welding, so that inner arm 250', steel tube 268, and steel web plate 270 together constitute a unitary, rigid, high-strength structural member.

As also seen in FIG. 7, a steel tube 272 is integrated with the inner end of inner arm 252', as by arc welding, and a steel web plate 274 is permanently affixed to inner arm 252' and steel tube 272, as by arc welding, so that inner arm 252', steel tube 272, and steel web plate 274 together constitute a unitary, rigid, high-strength structural member.

As also indicated in FIG. 7, inner arm 250' is pivotably mounted on mounting beam 108 by inserting tube 268 between the flanges of beam 108, aligning the bore of tube 268 with holes 154 and 164 in those flanges, passing a bolt 276 through holes 154 and 156 and the bore of tube 268, and securing a nut 278 to the lower end of bolt 276 in the well-known manner. Inner arm 252' is similarly pivotably affixed to mounting beam 108 by means of a bolt 280 and a nut 282. Bolts 276 and 280 may be provided with suitable transverse bores for receiving cotter keys for the purpose of retaining their associated nuts thereon.

Referring again to FIG. 7, it will be seen that bumper arm 254 comprises a first pair of box tube beam members 290, 292; a second pair of box tube beam members 294, 296; and an intermediate pair of box tube beam members 298, 300. All of these beam members are fabricated from prefabricated steel box tubing, and the dimensions thereof are such that beam members 298 and 300 are capable of being close-fittingly received within the other beam members 290, 292, 294, 296. Beam members 290 and 292 are of the same length, and are joined together in side-by-side relation, as by arc welding. Beam members 294, 296 are of the same length, and are joined together in side-by-side relation, as by arc welding. Beam member 298 is telescoped into beam member 294, and is secured therein against being withdrawn therefrom. Beam member 300 is telescoped into beam member 296, and is secured therein against being withdrawn therefrom.

A plurality of holes 302 are provided in the upper surface of beam member 300. A T-headed pin 304 is normally disposed in a hole 306 in the upper surface of beam member 290, and coacts with any selected one of the holes 302 to lock beam members 290, 292 and 298, 300 in different, selected degrees of mutual engagement, and thus to lock bumper arm 254 in different, selected degrees of extension.

Comparing FIGS. 5 and 7, it will be seen that steel plates 308, 310 are affixed to the outer faces of beam members 294, and 296, as by arc welding, and that steel plates 312, 314 are affixed to the outer faces of beam members 290 and 292, as by arc welding.

A hollow moulding of resilient material such as rubber or neoprene is mounted on plate 308 by means of a retaining plate 318 which is itself affixed to plate 308 by means of threaded studs passing through suitable openings in plate 308, and nuts engage with said studs bearing against the rear face of plate 308.

Similar hollow mouldings 320, 322, 324 are similarly affixed to plates 310, 312, and 314, respectively, by means of retaining plates 326, 328, 330, etc.

As may be seen by comparison of FIGS. 5 and 7, an end plate 332 is affixed to the outer ends of beam members 294 and 296, and to the outer end of plate 308, as by arc welding. Similarly, an end plate 334 is affixed to the outer ends of beam members 290 and 292, and to plate 314.

Figures 9, 10, 11, 12:
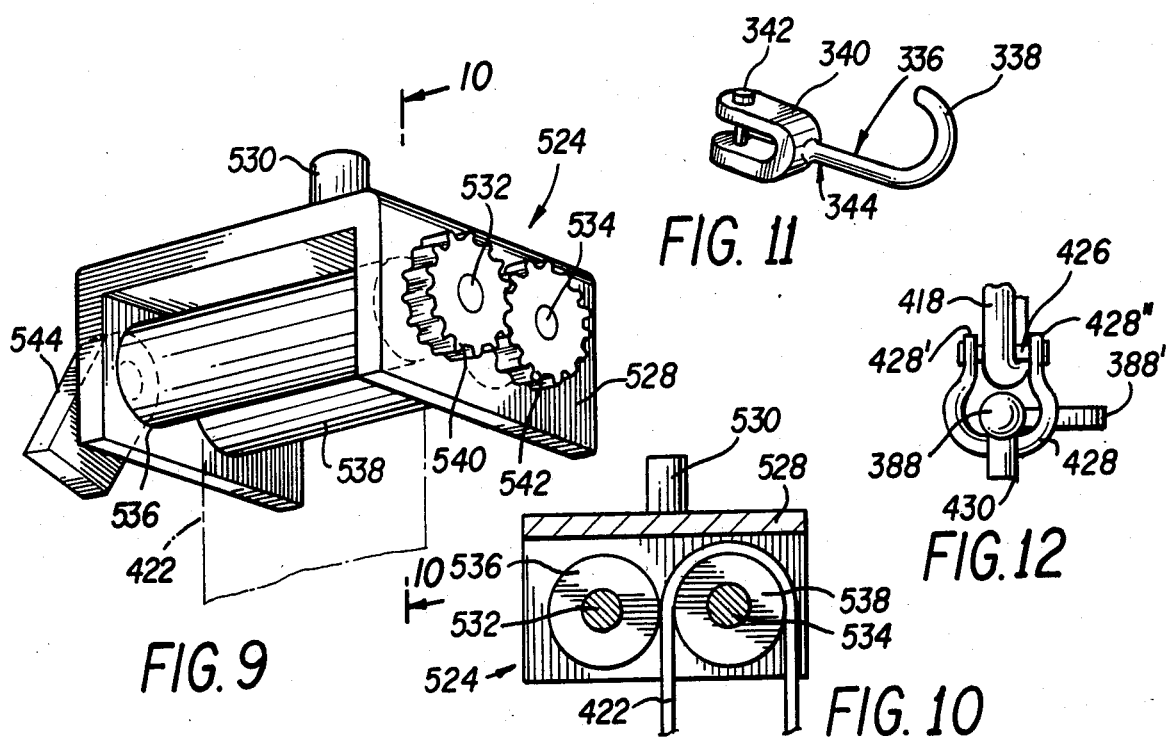
FIG. 9 is a perspective view of a belt binder of our invention.
FIG. 10 is a partial sectional view of the belt binder of FIG. 9, taken along line 10—10.
FIG. 11 is a perspective view of a safety chain retaining hook of the device of the preferred embodiment.
FIG. 12 is a partial view of a safety feature of the wheel cradle of the preferred embodiment.

In accordance with a particular feature of our invention, a safety chain retaining hook 336 (FIG. 11) is affixed to end plate 332, as by arc welding. As seen in FIG. 11, retaining hook 336 comprises a hook portion 338, and a clevis 340, provided with suitable holes for containing a locking pin 342. The shank of hook portion 338 is offset with respect to clevis 340 so as to provide a bottom face 344 which can be joined to plate 332 by arc welding.

Comparing FIGS. 2 and 5, it will be understood that hook 336 is so disposed on plate 332 that hook portion 338 is oriented downwardly at about a 30 degree angle, and clevis 340 projects above the upper edge of end plate 332.

In accordance with the principles of our invention, a safety chain of well-known type can be secured at one of its ends to the vehicle being towed in well-known manner, a portion thereof near the other end can be engaged with hook portion 338, and the other end thereof secured to clevis 340 by means of pin 342, thus protecting against accidental disengagement of the vehicle being towed from cradle 26.

A substantially identical retaining hook 346 is affixed to end plate 332 in the same manner, for the same purpose.

Further comparing FIGS. 2 and 5, it will be seen that a tube 348 is affixed to the outer end of outer arm 252", as by arc welding. It will also be seen that a pair of steel plates 350, 352 are affixed to the top of beam member 294 and the bottom of beam member 296, respectively, as by arc welding. A pair of aligned holes are provided in the outer ends of plates 350 and 352, to receive a bolt 354 which passes through the bore of tube 348. A nut 356 is engaged with the lower end of bolt 354, and may be secured thereto by a suitable cotter key arrangement or the like. Thus, the end of bumper arm 254 carrying bumper mouldings 316, 320 is pivotably affixed to support arm 250. A similar pair of steel plates 358, 360 (not shown) is similarly affixed to beam members 290, 292, respectively. A similar tube 362 (not shown) is similarly affixed to the outer end of support arm 252. A similar bolt 364 (FIG. 5) passes through holes in plates 358 and 360 and the bore of tube 362 and is secured by a suitable nut 366 (not shown), and thus the end of bumper arm 254 carrying bumper mouldings 322, 324 is pivotably affixed to support arm 252.

In accordance with a principal feature of our invention, then, bumper assembly comprises three arms 250, 252, 254, each of which is adjustable in length, and may be locked at any one of a predetermined number of selectable lengths. Further, in accordance with the principles of our invention, the ends of support arms 250, 252 remote from bumper arm 254 are separately pivoted on closely adjacent pivot bolts 276, 280 (FIG. 5), and thus bumper arm 254 will closely track the towing vehicle 12, and minimize the amount of rubbing contact between the bumper 16 of the towed vehicle and the resilient mouldings 316, 318, 322, 324. By the provision of these three adjustable arms, our invention makes it possible to maintain bumper arm 254 as near as possible to the rear end of the towing vehicle, while at the same time permitting the ready positioning of the bumper arm in close proximity to a vehicle being secured to towing apparatus 10 by making but one arm extension adjustment.

Comparing FIGS. 1 and 5, it will be seen that a belt binder 370 is affixed to the upper ends of plates 308 and 310, as by arc welding. Similarly, a belt binder 372 is affixed to the upper ends of plates 312 and 314. In the known manner, each belt binder comprises an upper serrated roller and a lower serrated roller, each of which is eccentrically mounted on a shaft which carries a spur gear on its outer end. These spur gears are meshed, so that the serrated rollers approach or retreat from each other as either one of the shafts is turned, and thus the other shaft is turned as well. Also in the well-known manner, a manually manipulable is provided on the outer end of one of these shafts, whereby the serrated rollers can be caused to advance toward or retreat from each other, to permit the insertion of a towing belt between the rollers, or to cause the rollers to grip the towing belt. Suitable spring means or the like may be provided to resiliently bias the serrated rollers toward their mutually contacting position.

In accordance with a principal feature of our invention, as illustrated in FIG. 1, the towing vehicle is preferably secured to bumper arm 254 by means of two towing belts 374, 376, the outer ends of which are provided with hooks which are hooked to the vehicle being towed, and the inner ends of which are securely, frictionally locked in belt binders 370, 372, respectively.

In accordance with another feature of our invention, the front wheels 14, 15 of the towed vehicle are preferably supported in a rigid cradle 26, FIG. 1.

As seen in FIG. 1, cradle 26 comprises an extensible arm 380 which itself comprises an outer steel box tube member 380' and an inner steel box tube member 380" which telescopes into outer box tube member 380'. A set of spaced holes 382 in one face of inner tube member 380", cooperating with a T-headed pin 384 and an associated hole (not shown) in the corresponding face of outer tube member 380', make it possible to selectively lock arm 380 in a plurality of different degrees of extension, thus to accommodate towed vehicles having different front wheel spacings. A steel cross bar 386 is fixedly attached to one end of arm 380, and thus cannot be tilted with respect to arm 380, in their common plane. A pair of wheel receiving members 388, 390 are rigidly affixed to the outer ends of cross bar 386, as shown in FIG. 1.

A second cross bar 392 is pivotably affixed to the opposite end of arm 380, as by a pivot pin 394 passing between a pair of mounting plates 396, 398. A locking arm 400 is pivotably affixed to arm 380 by means of a pivot pin 402 passed through suitable holes in ears 404, 406, which are themselves affixed to outer tube member 380', as by arc welding. The opposite end of locking arm 400 may be locked between a pair of ears 410, 412 by means of a suitable T-headed pin 408, which can pass through registered holes in locking arm 400 and ears 410 and 412. Ears 410 and 412 are permanently affixed to pivotable cross bar 392, as by arc welding. A pair of wheel receiving members 414, 416 similar to wheel receiving members 388, 390, are affixed to the opposite ends of pivotable cross bar 392.

As seen in FIG. 1, each wheel receiving member is provided with a wheel engaging flange. Thus, wheel receiving member 390 is provided with a wheel engaging flange 390', etc.

As also seen in FIG. 1, wheel 14 is retained in cradle 26 by means of a continuous loop of high-strength flexible tubing 418, wheel 15 is retained is cradle 26 by means of a continuous loop of high-strength flexible tubing 420. Tubing loop 418 passes through a loop formed in the end of a suspending belt 422, and tubing loop 420 passes through a loop formed in the end of a suspending belt 424. The manner of suspending these belts, and thus suspending cradle 26, will be described hereinafter.

Referring now to FIG. 12, there is shown the outer end of wheel receiving member 388 and the manner in which tubing loop 418 is secured thereto, etc. As there seen, one end of tubing loop 418 is engaged with a pin 426 which serves to complete a ring 428, which itself is engaged with the outer end of wheel receiving member 388. Pin 426 may be secured in aligned holes in the ears 428', 428" of ring 428 in any of many well-known manners.

A projection 430 from the outer end of wheel receiving member 388 prevents ring 428 from slipping off the outer end of member 388. It is to be understood that the outer end of each wheel receiving member 390, 414, 416 is similarly provided with a ring, pin, etc., to lock an end of its associated tubing loop 418, 420 thereto.

Referring now to FIG. 8, cradle suspender assembly 28 is shown in detail.

Cradle suspender assembly 28 comprises a cradle suspender support rail 440 and a rail support member 442.

As best seen in FIG. 2, rail support member 442 is a prefabricated steel box tube beam which closely fits within the vertical member 100 of carriage assembly 20.

Referring again to FIG. 8, it will be seen that a pair of steel plates or ears 444, 446 are affixed to the upper end of rail support member 442, as by arc welding.

A pair of aligned holes 448, 450 are provided in the outer ends of ears 444 and 446. A corresponding pair of aligned holes are provided in the upper end of support rail 440. Thus, the upper end of support rail 440 can be affixed to ears 444 and 446, and rail support member 442, by means of a pin or the like 456, passing through the aligned holes 448, 450, 452, 454. Suitable retaining means of well-known type may be provided for retaining pin 456 in the aligned holes, and thus securing support rail 440 to rail support member 442.

As also seen in FIG. 8, a steel foot plate 460 is affixed to the lower end of cradle suspender support rail 440, as by arc welding. Foot plate 460 is provided with a pair of holes 462, 464 for receiving bolts whereby it is mounted on mounting beam 108. As seen in FIG. 5, the pivot bolts 276 and 280 of bumper assembly 24 pass through holes 462 and 464 in foot plate 460, and thus secure cradle suspender support rail 440 to mounting beam 108.

Referring again to FIG. 8, it will be seen that a sleeve member 466 is slidably mounted on support rail 440, sleeve member 466 having a central opening 468 through support rail 440 passes. A face of support rail 440 is provided with a plurality of spaced holes 470, each of which is adapted to receive the inner end of a T-shaped pin 472, whereby to lock sleeve member 466 to support rail 440 at a selected one of a number of predetermined positions.

Sleeve member 466 further comprises a plurality of integral flanges, each of which is provided with a central hole 476. The respective vertically disposed pairs of holes 476 are so aligned as to be adapted to receive a support arm mounting bolt 478, 480 (only one shown in FIG. 8).

A pair of cradle support arms 482, 484 are pivotably mounted on sleeve member 466 by means of said support arm mounting bolts 478, 480.

Each cradle support arm comprises an inner member and an outer member telescopingly engaged within the inner member. Thus, support arm 482 comprises an inner member 482' and an outer member 482"; and support arm 484 comprises an inner member 484' and an outer member 484".

Outer member 482" is provided with a spaced set of holes 486 adapted to receive the end of a T-headed pin 488 which itself passes through a hole 490 in the upper face of inner member 482'. By this means, the overall length of support arm 482 may be adjusted to a selected one of a plurality of predetermined lengths. Similarly, outer member 484" is provided with a spaced set of holes, and inner member 484' is provided with a T-headed pin 494 adapted to pass through a hole 496, whereby the length of support arm 484 may be adjusted to any selected one of a plurality of predetermined overall lengths.

A steel tube 498 is integrated with the inner end of inner member 482', and a reinforcing web 500 is welded to inner member 482' and to tube 498. Similarly, a steel tube 502 and a steel web 504 are welded to inner member 484', and to each other.

A plurality of ears 506 are affixed to inner member 482', and a plurality of ears 508 are affixed to inner member 484'. Each of these ears is provided with a hole for receiving a spreader arm mounting bolt, described hereinafter.

As further seen in FIG. 8, cradle suspender assembly 28 further comprises a spreader arm 510 which comprises two telescoping steel box tube members 510' and 510". Member 510" is provided with a plurality of holes 512, and member 510' is provided with a T-headed pin 514 adapted to fit in a hole 516, whereby the length of spreader arm 510 may be adjusted in the well-known manner. As seen in FIG. 1, the respective ends of spreader arm 510 are adapted to fit between the adjacent pairs of ears 506, 508 on arms 482, 484. Spreader arm 510 is further provided with holes 518, 520 at its extremities. Holes 518, 520 are adapted to receive suitable pins which also pass through the holes in ears 506, 508, whereby spreader arm 510 can be secured between cradle support arms 482 and 484.

Thus, it will be seen that the angle subtended between cradle support arms 482 and 484 is determined by the length setting of spreader arm 510, and the selected ears 506, 508 to which spreader arm 510 is secured.

As further seen in FIG. 8, a belt binder 524 is affixed to the outer end of support arm 482, and a belt binder 526 is affixed to the outer end of support arm 484.

Belt binders 524 and 526 are substantially identical, and belt binder 524 is shown in detail in FIGS. 9 and 10.

Belt binder 524 comprises a frame 528 to the top plate of which is affixed a threaded stud 530 by means of which belt binder 524 is affixed to support arm 482.

A pair of rotatable shafts 532, 534 are journaled in frame 528. An eccentric, serrated roller 536 is affixed to shaft 532, and an eccentric, serrated roller 538 is affixed to shaft 534. Spur gears 540 and 542 are respectively affixed to shafts 532 and 534, and are meshed, as shown in FIG. 9. An operating handle 544 is affixed to shaft 532. In the well-known manner, cradle suspender belt 422 (FIG. 1) can be clamped between rollers 536 and 538 by first operating handle 544 to separate rollers 536 and 538, thrusting belt 422 therebetween, and returning handle 544 to its clamping position. The mass of handle 544 will in general provide sufficient force tending to main rollers 536 and 538 in their belt engaging position, but additional resilient means for the same purpose can be supplied by those having ordinary skill in the art without the exercise of invention.

As seen in FIG. 1, cradle assembly 26 is supported from support arms 482, 484 by means of belts 422, 424, which are secured to support arms 482, 484 by their respective belt binders 524, 526.

It will thus be seen that the objects set forth above, among those made apparent from the preceding description, are efficiently attained, and since certain changes may be made in the above constructions and the methods carried out thereby without departing from the scope of our invention, it is intended that all matter contained in the above description or shown in the accompanying drawings shall be interpreted as illustrative only, and not in a limiting sense.

It is also to be understood that the following claims are intended to cover all of the generic and specific features of our invention herein described, and all statements of the scope of our invention which, as a matter of language, might be said to fall therebetween.

What is claimed is:

1. Vehicle towing apparatus, comprising:
    elongated mast support members affixed to the floor of the body portion of a motor vehicle;
    a mast erected upon said mast support members, said mast including rail members and a head member disposed between said rail members;
    a carriage slidably disposed upon said mast, said carriage including a transverse member extending between said rail members and slidably coupled thereto and a including a longitudinal member secured to said transverse member and slidably coupled to said head member
    a bumper assembly having a pair of bumper support arms each having a first end coupled to said transverse member at separate, closely adjacent pivots, said bumper support arms each having a second end and a means for adjusting the length of said bumper support arms, said bumper assembly having a selectively elongated bumper, said second ends of the bumper support arms affixed to opposed ends of said elongated bumper at pivots, said bumper having a first means for securing a vehicle to be towed, a cradle assembly having a means for coupling said cradle assembly to said longitudinal member of the carriage and having a pair of cradle support arms, said cradle support arms each having a first end affixed to said means for coupling said cradle assembly at separate, closely adjacent pivots, said cradle support arms having second ends supporting a second means for securing a vehicle to be towed and having a means for adjusting the length of said cradle support arms, and a power means for slidably positioning said cradle upon said mast.

2. Vehicle towing apparatus as claimed in claim 1 in which said head member is provided with a central bore and said longitudinal member passes therethrough, said means for coupling said cradle assembly to said longitudinal member including a cradle support rail extending parallel said longitudinal member and including a horizontal member, said horizontal member having a first end fixed to said cradle support rail and a second end fixed to said longitudinal member, said means for coupling said cradle assembly further including a means for adjusting the position of said cradle support arm pivots along said cradle support rail.

3. Vehicle towing apparatus, comprising:
a mast adapted to be erected upon a motor vehicle,
a carriage slidably disposed upon said mast, said carriage having a vertically oriented longitudinal member and a mounting member,
a bumper assembly including a pair of selectively elongatable bumper support arms and a selectively elongatable bumper arm, said bumper support arms having first ends affixed to said mounting member at separate, closely adjacent pivots and having second ends pivotably affixed to opposed ends of said bumper arm, said bumper arm having a first means for securing a vehicle to be towed,
a cradle assembly having an upwardly extending cradle support rail having a lower end mounted to said mounting member, said cradle support rail having an upper end having a means for affixing said upper end to said longitudinal member, said cradle assembly having selectively elongatable cradle support arms and a support rail sleeve, said support rail sleeve having a central bore sufficiently large to receive passage of said support rail therethrough and having a means for adjusting the position of said sleeve upon said support rail, said cradle support arms having first ends affixed to said sleeve at separate, closely adjacent pivots and having second ends supporting a second means for securing a vehicle to be towed, and
a power means for slidably positioning said carriage upon said mast.

4. Vehicle towing apparatus, comprising:
a mast erected upon a motor vehicle;
a carriage slidably disposed upon said mast, said carriage including a vertical longitudinal member and a horizontal mounting member, a cradle assembly having a pair of cradle support arms and a cradle support rail, said cradle support rail having a first end affixed to said mounting member of the carriage and having a second end coupled to said longitudinal member, said cradle support arms each having a first end and a second end and a means for selectively elongating said arms, said first ends of the cradle support arms coupled to said cradle support rail at separate pivots, said cradle support rail having a means for adjusting the position of said cradle support arms relative to the mounting member, said second ends of the cradle support arms each supporting a cradle belt, said cradle belts each having a wheel receiving cradle, said cradle assembly having a selectively elongated spreader arm and a selectively elongatable spine member, said spreader arm attached at opposite ends to a cradle support arm, said spine member attached at opposite ends to said wheel receiving cradles, a bumper assembly having a pair of selectively elongatable bumper support arms and a selectively elongatable bumper arm, said bumper support arms having first ends coupled to said mounting member of the carriage at separate pivots and having second ends pivotally attached to opposed ends of said bumper arm, said bumper arm having at least one belt, said belt having a means for securing a vehicle to be towed, and a power means for slidably positioning said carriage upon said mast.

5. Vehicle towing apparatus as claimed in claim 1 wherein said second means of a securing a vehicle to be towed includes a vehicle wheel cradle adapted to be suspended from said cradle support arms, said wheel cradle including an elongated spine member, said first and second vehicle wheel receiving means affixed to said spine member adjacent its opposite ends.

6. Vehicle towing apparatus as claimed in claim 5 in which at least one of said vehicle wheel receiving means is pivotable with respect to said spine member.

7. Vehicle towing apparatus as claimed in claim 6, further comprising locking means for locking said pivotable vehicle wheel receiving means into a particular orientation with respect to said spine member.

8. Vehicle towing apparatus of claim 1 wherein said first means for securing a vehicle to be towed includes at least one belt binder and at least one belt, each belt binder securing a belt, each belt having a hook means for hooking a vehicle.

9. Vehicle towing apparatus as claimed in claim 3 wherein said second means of securing a vehicle to be towed includes a vehicle wheel cradle adapted to be suspended from said cradle support arms, said wheel cradle including an elongated spine member, and first and second vehicle wheel receiving means affixed to said spine member adjacent its opposite ends.

10. Vehicle towing apparatus as claimed in claim 9 in which at least one of said vehicle wheel receiving means is pivotable with respect to said spine member.

11. Vehicle towing apparatus as claimed in claim 10, further comprising locking means for locking said pivotable vehicle wheel receiving means into a particular orientation with respect to said spine member.

12. Vehicle towing apparatus of claim 3 wherein said first means for securing a vehicle to be towed includes at least one belt binder and at least one belt, each belt binder securing a belt, each belt having a hook means for hooking a vehicle.

* * * * *